United States Patent Office 3,832,346
Patented Aug. 27, 1974

3,832,346
2'-(4 PYRIDYL) - 6,16α - DIMETHYL - 20-OXO-11β,17α,21 - TRIHYDROXY-PREGNA - 4,6-DIENO (3,2-c) PYRAZOLE AND INTERMEDIATES IN THE PRODUCTION THEREOF
John Hannah, Matawan, N.J., assignor to Merck & Co., Inc., Rahway, N.J.
No Drawing. Continuation-in-part of application Ser. No. 167,802, July 30, 1971. This application Sept. 11, 1973, Ser. No. 396,287
Int. Cl. C07c 173/00
U.S. Cl. 260—239.5                4 Claims

ABSTRACT OF THE DISCLOSURE

The invention disclosed herein relates to the novel compound 2' - (4-pyridyl)-6,16α-dimethyl-20-oxo-11β,17α,21 - trihydroxy-pregna-4,6-dieno[3,2-c]pyrazole and its pharmacologically acceptable salts, characterized as having high anti-inflammatory activity on topical administration with relatively low systemic action, and to pharmaceutical compositions thereof adapted for topical use. This new topical anti-inflammatory steroid is prepared by reacting 4-hydrazino-pyridine with 2-hydroxy-methylene - 6,16α - dimethyl - 11β - hydroxy-17,20:20,21-bis (methylenedioxy)-pregna-4,6-diene-3-one, thereby forming 2'-(4-pyridyl)-6,16α-dimethyl-11β-hydroxy-17,20:20,21-bis(methylenedioxy)-pregna - 4,6 - dieno[3,2-c]pyrazole, and reacting the latter compound with an acidic hydrolyzing agent.

---

This is a continuation-in-part of application Ser. No. 167,802, filed July 30, 1971.

This invention is concerned generally with topical anti-inflammatory steroids. More particularly, it relates to a novel steroidal-pyrazole, namely 2'-(4-pyridyl)-6,16α-dimethyl - 20 - oxo - 11β,17α,21-trihydroxy-pregna-4,6-dieno[3,2-c]pyrazole and its pharmacologically acceptable salts, which are characterized by having, when administered topically, high local anti-inflammatory potency with relatively low systemic action. It also relates to topical pharmaceutical compositions containing 2'-(4-pyridyl)-6,16α-dimethyl-20-oxo-11β,17α,21 - trihydroxy-pregna-4,6-dieno[3,2-c]pyrazole or pharmacologically acceptable salt thereof, as an active ingredient, and to methods of treating inflammatory conditions in patients by topical administration of such compositions. The 2'-(4-pyridyl)-6,16α-dimethyl - 20 - oxo-11β,17α,21-trihydroxy-pregna-4,6-dieno[3,2-c]pyrazole and its pharmacologically acceptable salts as, for example, the hydrohalides, lower alkanoates, phosphate, perchlorate, picrate, nitrate, sulfate, phthalate, succinate, citrate, lactate, preferably the hydrochloride or acetate, and the like, and topical pharmaceutical compositions thereof, are particularly effective in topical treatment of dermatological disorders and like conditions, such as dermatitis (actinic, atopic, contact, eczematoid, seborrheic and stasis), dermatitis herpetiformis, lichen planus, neurodermatitis, intitrigo, lichen simplex chronicus, pruritus and psoriasis, as well as for topical treatment of inflammations of the respiratory and intestinal mucosa such as allergic rhinitis, bronchitis, bronchial asthma, bronchiectasis, colitis, and the like.

In accordance with the present invention, the intermediate 2' - (4-pyridyl)-6,16α-dimethyl-11β-hydroxy-17,20:20,21-bis(methylenedioxy)-pregna - 4,6 - dieno[3,2-c] pyrazole is prepared by bringing together in solution, preferably in an aqueous alkanol solution such as aqueous ethanol, 4-hydrazino-pyridine and 2-hydroxymethylene-6,16α - dimethyl-11β-hydroxy-17,20:20,21-bis(methylenedioxy)-pregna-4,6-diene-3-one. The reaction is conveniently conducted at the reflux temperature of the aqueous alkanol solution, under which conditions the condensation to form the steroidal-pyrazole is ordinarily complete in about 3–5 hours. The steroidal-pyrazole product is conveniently recovered from the reaction mixture by evaporating a portion of the alkanol solvent and diluting the residual mixture with water, whereupon the steroidal-pyrazole crystallizes and is recovered by filtration or centrifugation. Recrystalization of the crude steroidal-pyrazole thus obtained from an organic solvent, such as methylene chloride-ethanol gives substantially pure 2'-(4-pyridyl)-6,16α-dimethyl - 11β - hydroxy-17,20:20,21-bis (methylenedioxy)-pregna-4,6-dieno-[3,2-c]pyrazole. The latter compound is then reacted with an acidic hydroylzing agent, preferably an aqueous alkanoic acid such as aqueous formic acid, thereby hydrolyzing the 17,20:20, 21-bis(methylenedioxy) linkages. This acidic hydrolysis reaction is ordinarily conducted at a temperature of 95–100° C., at which temperature the hydrolysis of the bis (methylenedioxy) groupings is substantially complete in about one-half hour. The resulting steroidal-pyrazole product is conveniently recovered by cooling the hydrolysis mixture, and then extracting it with a water-immiscible organic solvent such as ethyl acetate; evaporation of the ethyl acetate extracts, followed by thin layer chromatography of the residual crude material, or alternatively by recrystallization of the crude material from an organic solvent such as methylene chloride, gives substantially pure 2'-(4-pyridyl)-6,16α-dimethyl-20-oxo-11β,17α,21-trihydroxy-pregna-4,6-dieno[3,2-c]pyrazole.

The 2'-(4-pyridyl)-6,16α-dimethyl-20-oxo-11β,17α,21-trihydroxypregna-4,6-dieno[3,2-c]pyrazole is ordinarily administered in the form of a pharmaceutical composition comprising 2'-(4-pyridyl)-6,16α-dimethyl-20-oxo-11β,17α,21-trihydroxypregna-4,6-dieno[3,2-c]pyrazole, or salt thereof, in combination with a pharmacologically acceptable carrier adapted for topical administration. These topical pharmaceutical compositions may be in the form of a cream, ointment, gel or aerosol formulation adapted for application to the skin for treatment of dermatoses; or it may be in the form of a solution, suspension or aerosol adapted for topical spray application to respiratory passages for treatment of nasal allergies, bronchial inflammations, and the like; or in the form of suppositories or enclosed in enteric capsules for treatment of intestinal inflammations. For treatment of dermatological disorders, these topical pharmaceutical compositions containing the presently invented steroidal pyrazole compounds, that is the 2'-(4-pyridyl)-6,16α-dimethyl-20-oxo-11β,17α,21-trihydroxypregna-4,6-dieno[3,2-c]pyrazole or pharmacologically acceptable salt thereof, ordinarily include about 0.01% to 0.25%, preferably about 0.10%, of the 2'-(4-pyridyl)-6,16α-dimethyl-20-oxo-11β,17β,21-trihydroxypregna-4,6-dieno[3,2-c]pyrazole compound, in admixture with 99.99% to 99.75% (preferably 00.90%) of gel vehicle comprising water, at least one organic solvent, and at least one thickening agent. The water ordinarily constitutes from about 8% to 18% of the gel vehicle, preferably about 13%. The organic solvent ordinarily constitutes about 60% to 90% of the gel vehicle. Representative solvents are ethyl alcohol, isopropyl alcohol, propylene glycol, glycerine, 2-octyl dodecanol and methyl pyrrolidine, and preferably isopropyl alcohol; propylene glycol mixtures at a ratio of 0.5 to 0.6 parts isopropyl alcohol to 1.0 part propylene glycol. The solubility of the steroidal pyrazole compound in the solvent system selected should be such as to obtain maximum partitioning of the steroid from the vehicle to the skin. The thickening agent, preferably hydroxyethyl cellulose, hydroxypropyl cellulose, and the like, ordinarily constitutes from 0.5 to 4.0% of the gel vehicle. Optionally, a stabilizing agent, such as disodium edetate, sodium citrate, dipotassium edetate, citric acid, and the like, in the proportion of about 0.02% to 0.1% of the gel vehicle may be employed, if desired.

A preferred topical pharmaceutical composition is prepared as follows: About 2.60 g. of hydroxypropyl cellulose is added to a solution of 0.05 g. of disodium edetate in 13.00 g. purified water while agitating the mixture and maintaining the temperature at about 60° C., and the agitation is continued until the hydroxypropyl cellulose is completely dispersed and wetted. To the resulting dispersed mixture is added, with agitation, a solution containing 0.1 g. of 2'-(4-pyridyl)-6,16α-dimethyl-20-oxo-11β,17α,21-trihydroxypregna - 4,6 - dieno[3,2-c]pyrazole dispersed in a mixture of 30.00 g. of anhydrous isopropyl alcohol and 54.25 g. of propylene glycol. The resulting gel mixture is stirred vigorously at room temperature for a period of approximately 15 minutes thereby forming a pharmaceutical composition adapted for the treatment of topical anti-inflammatory conditions, and which is especially effective for the alleviation of psoriasis.

The following examples illustrate methods of carrying out the present invention, but it is to be understood that these examples are given for purposes of illustration and not of limitation.

EXAMPLE 1

A solution containing approximately 0.4 g. of 4-hydrazino-pyridine hydrochloride dissolved in about 12 cc. of an 8:2 mixture of ethanol-water is added to a solution containing two molecular equivalents of potassium acetate dissolved in 5 cc. of water. To the resulting mixture is added a solution containing about one gram of 2-hydroxymethylene - 6,16α - dimethyl-11β-hydroxy-17,20:20,21-bis(methylenedioxy)-pregna-4,6-diene-3-one dissolved in about 25 cc. of warm ethanol. The resulting solution is heated at reflux temperature for a period of approximately 4 hours, at the end of which time about 10 cc. of solvent is evaporated, whereupon crystalline material separates from the reaction solution. The resulting crystalline slurry is diluted with an equal volume of water, and the insoluble material is recovered by filtration and dried to give about 1.3 g. of crude product which, upon crystallization from methylene chloride-ethanol solution, gives about 0.7 g. of substantially pure 2'(4-pyridyl)-6,16α-dimethyl - 11β - hydroxy-17,20:20,21-bis(methylenedioxy)-pregna-4,6-diene[3,2-c]pyrazole; m.p. 276-283° C. The mother liquors from the recrystallization are subjected to thin-layer chromatography on silica gel, utilizing 8% methanol as eluting solvent, to give an additional 0.18 g. of 2'(4-pyridyl)-6,16α-dimethyl-11β-hydroxy-17,20:21-bis(methylenedioxy)-pregna - 4,6 - diene[3,2-c]pyrazole.

EXAMPLE 2

A solution containing 0.365 g. of 2'-(4-pyridyl)-6,16α-dimethyl - 11β - hydroxy - 17,20:20,21 - bis(methylenedioxy)-pregna-4,6-dieno[3,2-c]pyrazole dissolved in 7 ml. of a 6:4 mixture of formic acid and water, is heated at a temperature of about 95-98° C. for a period of approximately twenty-five minutes. The reaction mixture is cooled to about 0° C., made alkaline by the addition of aqueous sodium hydroxide solution, and the resulting suspension is extracted with three 7 ml.-portions of ethyl acetate. The combined ethyl acetate extracts are dried over anhydrous magnesium sulfate, and the dry ethyl acetate solution is evaporated in vacuo to give about 0.375 g. of crude material which, upon recrystallization from methylene chloride, gives about 0.08 g. of substantially pure 2'-(4-pyridyl)-6,16α-dimethyl-20-oxo-11β,17α,21-trihydroxy-pregna-4,6-dieno[3,2-c]pyrazole; m.p. 209-213° C. The mother liquors from the methylene chloride recrystallization are subjected to thin-layer chromatography on silica gel, utilizing a 9:1 mixture of chloroform-methanol as eluting solvent, to give an additional 0.1 g. of 2'-(4-pyridyl)-6,16α-dimethyl-20-oxo-11β,17α,21-trihydroxy-pregna-4,6-dieno[3,2-c]pyrazole.

The 4-hydrazino-pyridine hydrochloride, employed as starting material in Example 1 hereinabove, may be prepared as follows:

A mixture of 7.30 g. of 4-chloropyridine, 8.63 g. of benzoylhydrazine and 25 cc. of anhydrous ethanol is heated in a bomb tube under pressure at a temperature of 120° C. for a period of approximately 14 hours. The reaction mixture is cooled, extracted first with hot ethanol and then with hot water, and the aqueous and ethanol extracts are combined and evaporated to dryness. The residual material is crystallized twice from a mixture of one part methanol to two parts ethyl acetate to give approximately 7.7 g. of N-(4-pyridyl)benzhydrazide; m.p. 225-231° C.

A mixture of 2.08 g. of N-(4-pyridyl)benzhydrazide and 15 cc. of 23% aqueous hydrochloric acid solution is heated under reflux for a period of about 3 hours. The resulting mixture is cooled to about 0° C., filtered, and the filtered solution is evaporated to dryness. The crystalline product is washed with one 15 cc.-portion of hot methanol, and with three 10 cc.-portions of cold methanol; the crystalline material is then dried to give about 1.2 g. of substantially pure 4-hydrazino-pyridine hydrochloride m.p. 245-250° C.

Various changes and modifications may be made in carrying out the present invention without departing from the spirit and scope thereof. Insofar as these changes and modifications are within the purview of the annexed claims, they are to be considered as part of this invention.

What is claimed is:

1. An anti-inflammatory steroid having the chemical name 2'-(4 - pyridyl)-6,16α-dimethyl-20-oxo-11β,17α,21-trihydroxy-pregna-4,6-dieno[3,2-c]pyrazole.

2. The steroidal pyrazole 2'-(4-pyridyl)-6,16α-dimethyl - 11β - hydroxy - 17,20:20,21 - bis(methylenedioxy)-pregna-4,6-dieno[3,2-c]pyrazole.

3. An anti-inflammatory steroid having the chemical name 2'-(4 - pyridyl)-6,16α-dimethyl-20-oxo-11β,17α,21-trihydroxy-pregna-4,6-dieno[3,2-c]pyrazole in combination with pharmaceutically acceptable topical carrier.

4. An anti-inflammatory steroid selected from the group consisting of 2'-(4-pyridyl)-6,16α-dimethyl-20-oxo-11β,17α,21 - trihydroxy-pregna-4,6-dieno[3,2-c]pyrazole and pharmacologically acceptable salts of 2'-(4-pyridyl)-6,16α-dimethyl - 20 - oxo-11β,17α,21-trihydroxy-pregna-4,6-dieno[3,2-c]pyrazole; and combinations thereof with pharmaceutically acceptable topical carrier.

References Cited

UNITED STATES PATENTS

| | | | |
|---|---|---|---|
| 3,657,435 | 4/1972 | Stonner | 424—241 |
| 3,704,295 | 11/1972 | Clinton | 260—239.5 |

ELBERT L. ROBERTS, Primary Examiner

U.S. Cl. X.R.

260—239.55 D